(12) United States Patent
Wass

(10) Patent No.: US 6,997,358 B2
(45) Date of Patent: Feb. 14, 2006

(54) LIQUID DOSING DEVICE

(76) Inventor: Anthony Charles Lammond Wass, The Mousehole, Duddington, Stamford, Lincolnshire (GB) PE9 3QE (*) Notice: Subject to any disclaimer, the term of this patent is extended or adjusted under 35 U.S.C. 154(b) by 0 days.

(21) Appl. No.: 10/489,208

(22) PCT Filed: Sep. 12, 2001

(86) PCT No.: PCT/GB01/04063

§ 371 (c)(1),
(2), (4) Date: Mar. 8, 2004

(87) PCT Pub. No.: WO03/025520

PCT Pub. Date: Mar. 27, 2003

(65) Prior Publication Data

US 2005/0000986 A1    Jan. 6, 2005

(51) Int. Cl.
*G01F 11/28* (2006.01)

(52) U.S. Cl. .............. 222/439; 222/438; 222/440; 222/453; 222/477

(58) Field of Classification Search ......... 222/207, 222/212, 434, 438, 439, 440, 453, 477
See application file for complete search history.

(56) References Cited

U.S. PATENT DOCUMENTS

| | | | | |
|---|---|---|---|---|
| 3,146,919 A | * | 9/1964 | Chappell | 222/212 |
| 3,567,079 A | * | 3/1971 | Weigand | 222/213 |
| 3,828,985 A | * | 8/1974 | Schindler | 222/207 |
| 4,728,011 A | * | 3/1988 | Schuster et al. | 222/477 |
| 4,811,871 A | * | 3/1989 | Wass et al. | 222/477 |
| 4,941,598 A | * | 7/1990 | Lambelet et al. | 222/95 |
| 5,253,788 A | * | 10/1993 | Vandromme et al. | 222/321.6 |
| 5,636,765 A | * | 6/1997 | DeJonge | 222/212 |
| 6,241,129 B1 | * | 6/2001 | Bonningue et al. | 222/207 |
| 6,343,716 B1 | * | 2/2002 | Baudin et al. | 222/207 |
| 6,415,961 B1 | * | 7/2002 | Bonningue | 222/212 |
| 6,484,906 B1 | * | 11/2002 | Bonningue | 222/207 |

FOREIGN PATENT DOCUMENTS

| | | |
|---|---|---|
| EP | 0 337 778 A2 | 10/1989 |
| EP | 0952 090 A1 | 10/1999 |
| GB | 2201395 A * | 9/1988 |
| GB | 2360273 A * | 9/2001 |

* cited by examiner

*Primary Examiner*—James Hook
(74) *Attorney, Agent, or Firm*—Woodling, Krost and Rust

(57) ABSTRACT

A device (2) for fitting to the neck of a deformable bottle (4) to give a metered dose of liquid when the bottle is squeezed. The liquid dispensed through outlet (30) has to pass through a metering chamber (34) in which it is directed around or through a freely-moving shuttle (8), movement of the shuttle (8) with the flow being resisted by the creation of a partial vacuum in the expanding control chamber (42) behind the shuttle, so that the rate at which the shuttle moves to the outlet end of the metering chamber (34) to close the outlet (30), and hence the amount of liquid dispensed, is controlled by the rate at which liquid can enter control chamber (42). Because it is configured so that all the liquid enters metering chamber (34) at its inward end, the chamber may fitted either inside or outside the neck of the bottle (4) and the dose may be adjusted by moving the outlet (30) closer to, or further from, the inlet.

14 Claims, 3 Drawing Sheets

LIQUID DOSING DEVICE

Figure 1:
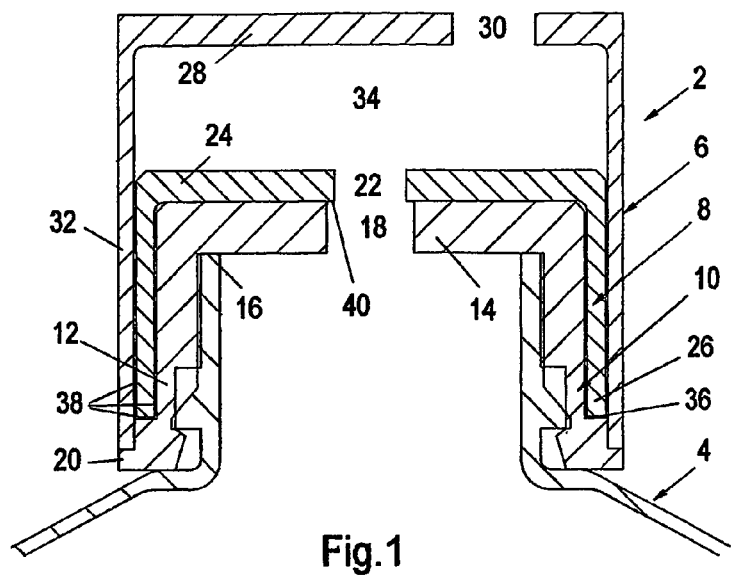

This invention relates to a device for delivering a metered dose of liquid from a squeezable bottle. As used herein, 'squeezable bottle' means any closed container for holding liquid products which is temporarily deformable by manual pressure.

There are various known liquid metering devices for squeezable bottles, in which there is a metering chamber having a single outlet but two sets of inlets. To avoid repetition, where the terms 'inlet' and 'outlet' are used, they can refer to a set of openings as well as a single one. The main flow of liquid, which enters the chamber by one inlet, is initially free to flow directly out of the outlet. A pilot flow of liquid, which enters the chamber through the other inlet, drives an obturating component, commonly a ball, along the chamber until it closes off the outlet. As the ratio of main to pilot flows can be quite large, this arrangement is potentially capable of dispensing a large dose through a relatively small chamber. Devices of this type are described in U.S. Pat. No. 3,146,919, filed in 1960, and U.S. Pat. No. 3,567,079, filed in 1968, and in GB 2201395, filed in 1986.

Although each of these inventions should be capable of delivering accurately metered doses of a given liquid, none appears to have found wide acceptance. In the case of the last named patent, of which I was co-inventor, this is because the dose has been found to be constant only so long as there is no variation in either the viscosity or the surface tension of the liquid being dispensed or in the force with which the bottle is squeezed. The same is probably true of the other two inventions.

Apart from inconsistency of dose, the fact that all of the above devices require inlets at both ends of the device means that they all suffer from the following inherent limitations: (a) they have to be configured so that they fit within the neck of the bottle, rather than be attached to the outside, (b) they can only provide a user-selectable dose by changing the ratio of pilot to main inlet sizes, which is mechanically difficult as well as of doubtful accuracy, (c) they need a separate means of sealing the outlet to make the package 'shippable' and (d) they cannot completely empty the bottle.

The present invention differs from all the above devices in that it has all inlets to the device at the opposite end from the outlet. This not only simplifies the flow paths so allowing much better control of the flow ratios and hence much better consistency of dose but also (a) allows the device to be fitted either inside or outside the bottle, (b) the dose can be varied easily and accurately by altering the stroke, (c) the stroke can be reduced to zero, which effectively seals the outlet and (d) the bottle can be almost completely emptied as there is no need to provide a passageway around the metering chamber to the ports at the outlet end.

Essentially the invention comprises a liquid dosing device for fitting to the neck of a squeezable bottle comprising a metering chamber having an inlet or inlets at its inward end to connect its interior to the inside of the bottle and an outlet or outlets at its outward end through which liquid is dispensed, the chamber being divided into two by a freely-moving shuttle, which falls to the inlet end of the chamber when the bottle is upright, the chamber and shuttle being so configured that, when the bottle is inverted and then firmly squeezed, liquid which is forced into the metering chamber is divided into a main flow component which passes through or around the shuttle but substantially by-passes the chamber behind it, this flow then being discharged through the oulet(s), and a pilot flow component which is fed into the chamber behind the shuttle but is substantially prevented from passing to the outlet side of the shuttle, so that although the shuttle tends to be moved by the viscous drag or impact of the flow of liquid upon it, any such movement expands the chamber behind it, thus creating a partial vacuum within it which prevents the shuttle expanding the chamber faster than the pilot flow can fill it, and therefore the ratio of main to pilot flow components determines the rate at which the shuttle will move and hence how much liquid is dispensed before the shuttle reaches the far end of the metering chamber, where it occludes the outlet(s) and prevents any further dispensing of liquid until the process is repeated.

Preferably, the main flow component constitutes the major portion of the whole flow of liquid forced into the metering chamber and the pilot flow constitutes a minor portion.

The metering chamber is most preferably cylindrical.

In a simple embodiment, the chamber and shuttle are both of circular cross-section, the shuttle being in the form of a piston which allows little if any flow past its periphery but has a central hole which is in alignment with the inlet to the chamber and out of alignment with the outlet, the outlet preferably being at least as large as the inlet, and both being at least as large as the hole through the shuttle. When the bottle is inverted and squeezed most of the liquid (i.e. the main flow) passes straight through the shuttle and thence out of the spout but a proportion of the liquid (i.e. the pilot flow) is trapped behind the shuttle and gradually carries it forward, the ratio of hole sizes determining how much liquid is dispensed before the shuttle reaches the spout end of the metering chamber and closes off the outlet hole.

Experiment has shown that an embodiment of this type can have a high magnification ratio (up to 5:1 or more) and dispense the same dose (to within plus or minus 10%), regardless of normal manufacturing changes in the properties of the product being dispensed or of who squeezes the bottle, provided it is squeezed fairly firmly. Unlike other forms of magnifying doser, the components may be very simple mouldings, without the need for very close tolerances. Other features found in few if any alternatives are (a) the ability to alter the dose by varying the stroke, (b) complete emptying of the bottle and (c) rapid resetting after a dose has been dispensed.

Figure 2:
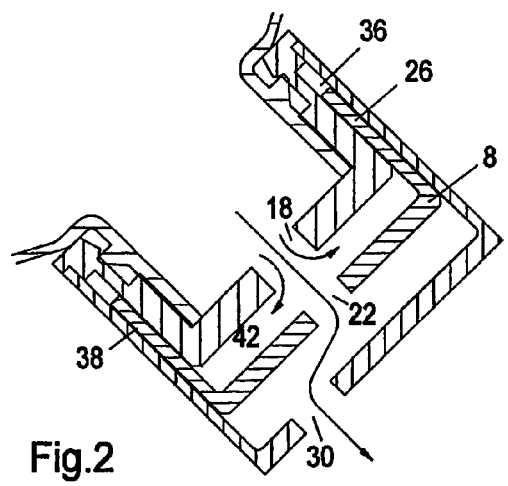
Figure 3:
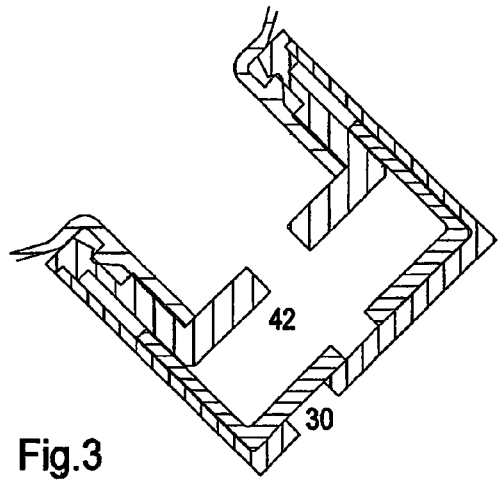
Figure 4:
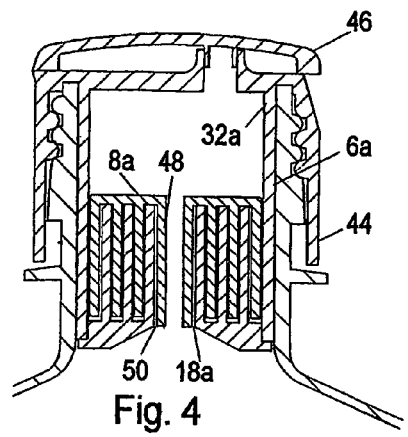
Figure 5:
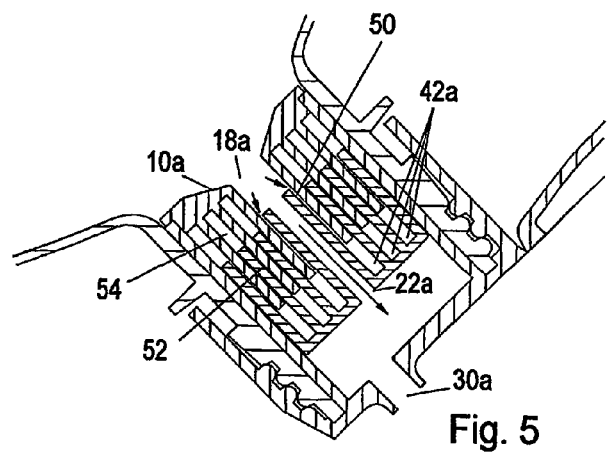
Figure 6:
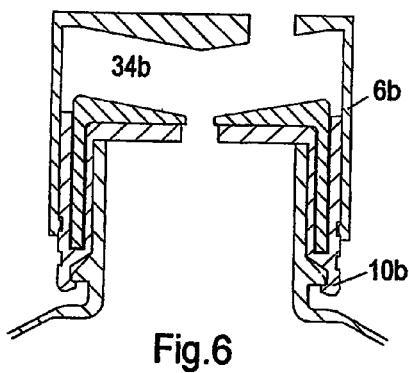
Figure 7:
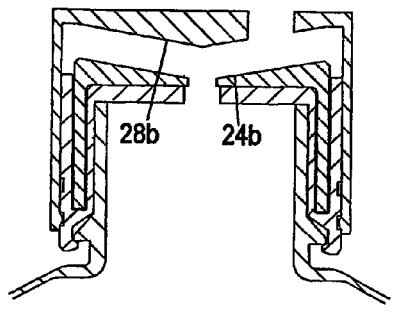
Figure 8:
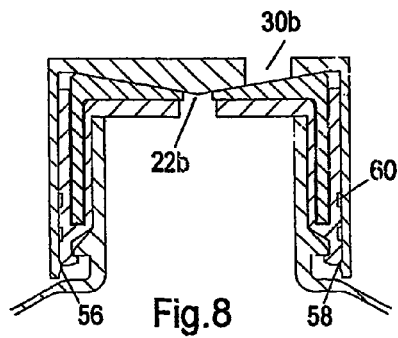
Figure 9:
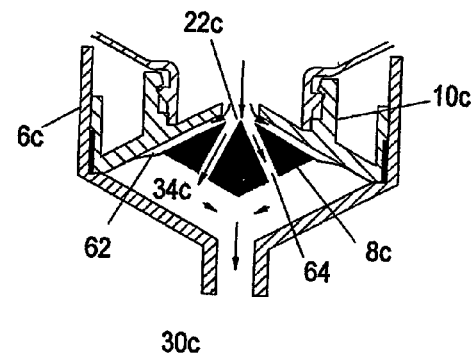
Figure 10:
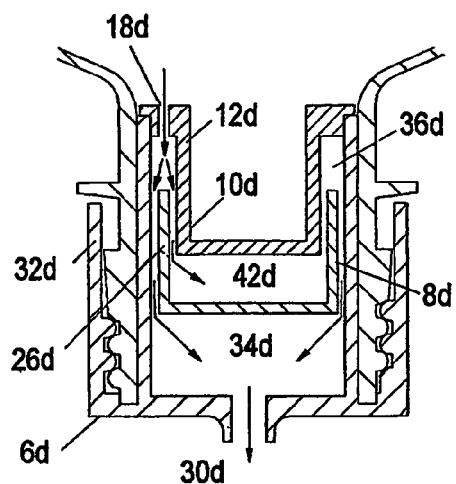
Figure 11:
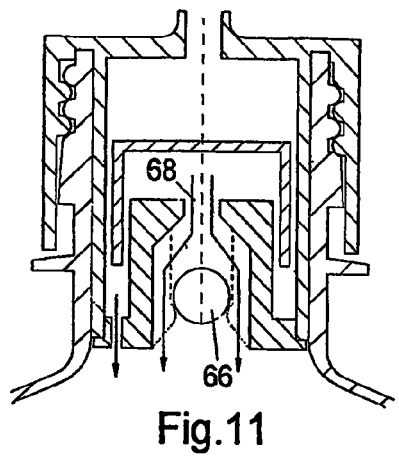
Figure 12:
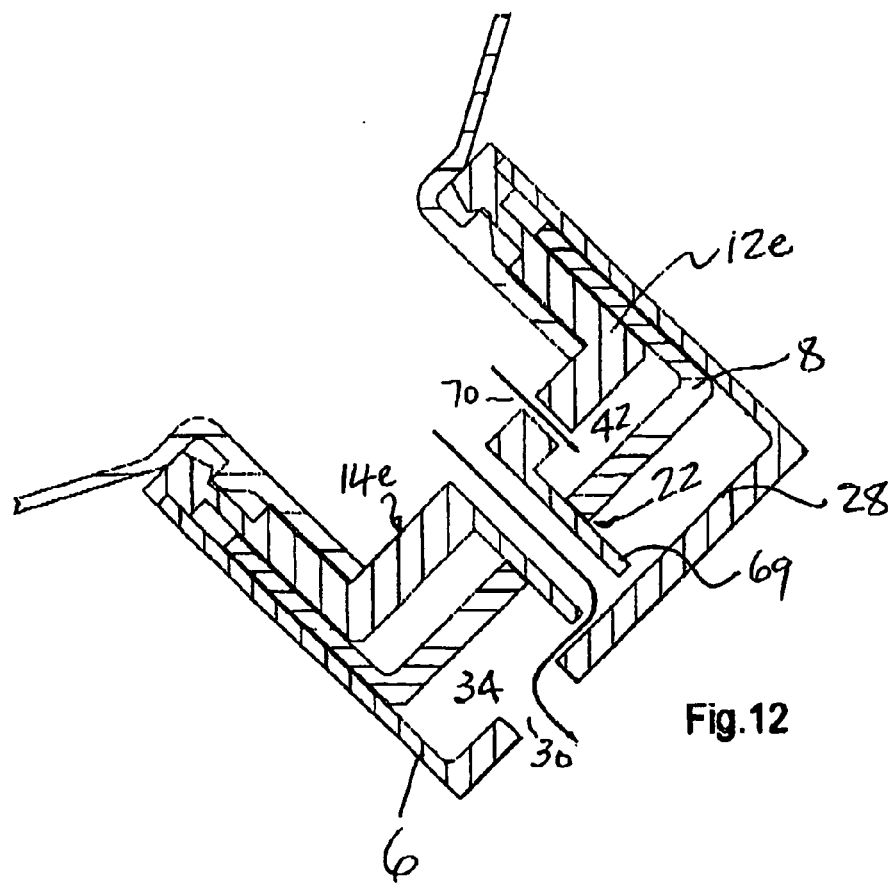

By way of example, some embodiments of the invention are described below with reference to the drawings, all of which are vertical cross-sections, showing the device attached to the neck of a bottle (most of which is not shown) by conventional means (which are not described but may be a snap fit as shown or a screw thread). For descriptive purposes 'up' and 'down' refer to the orientation when the bottle is upright and all components are assumed to be substantially circular in plan, as this is the most likely (though not essential) form in practice. Relevant details of the drawings are as follows:

FIG. 1 shows a simple embodiment mounted on the outside of a bottle in the upright, i.e. non-operating, position, in which both main and pilot flows are directed through the shuttle but are not physically divided, FIG. 2 shows the same embodiment after the bottle has been partly inverted and while it is being squeezed, FIG. 3 shows the same embodiment when the shuttle has reached the end of its stroke and has closed the outlet, FIG. 4 shows an embodiment in which the shuttle incorporates a hollow spigot which physically divides the main and pilot flows as they enter the doser and in which the functional parts are mounted within the neck of a bottle and have a hinged cap that can be closed to seal the outlet, FIG. 5 shows the same embodiment as in FIG. 4 while a dose is being discharged, FIGS. 6 to 8 show a similar embodiment to that shown in FIG. 1 except that the length of the metering chamber can be altered from one that gives a maximum dose, as shown in FIG. 6, through a reduced dose (FIG. 7) to zero dose (FIG. 8), FIG. 9 shows an embodiment in which the shuttle is sealed to the sides of the metering chamber by a flexible diaphragm, FIG. 10 shows an embodiment in which the main flow is directed around the shuttle, FIG. 11 shows a similar embodiment but with a one-way valve that allows the shuttle to be reset quickly, and FIG. 12 shows an embodiment which is similar to that shown in FIGS. 1 to 3 except that the main flow is passed through the shuffle by a fixed hollow spigot and the pilot flow is directed through a separate passageway into the chamber behind the shuttle.

With reference to FIG. 1, a dosing device 2 is mounted on the neck of a squeezable bottle 4, the device comprising three components, body 6, shuttle 8 and core 10, all of which may be injection-moulded from rigid plastic materials and each of which is essentially in the form of an inverted cup, having a downwardly-extending skirt and a closed top. The three components fit one within the other. The innermost one is core 10, which resembles a conventional closure cap in that its skirt 12 incorporates the means of attaching it to the neck of the bottle and its top 14 forms a seal 16 around the top of the neck. Unlike a closure, however, it has a centrally-located hole 18 through it and skirt 12 has an outwardly-extending flange 20 to which body 6 is attached. Hole 18 is co-axial with a hole 22 in the top 24 of shuttle 8, whose skirt 26 is a close but clearance fit around core skirt 12 and, when shuttle top 24 is in contact with core top 14, shuttle skirt 26 extends almost to the top of core flange 20. The top 28 of body 6 has an offset outlet hole 30 and its skirt 32 is a close but clearance fit around shuttle skirt 26 but a tight fit on core flange 20. Between them core 10 and body 6 enclose metering chamber 34, which extends upwards from the upper surface of core top 14 to the underside of body top 28, and an annular recess 36, which extends downwards from the core top 14 to flange 20. The clearance 38 between shuttle skirt 26 and the sides of recess 36 is just sufficient to allow shuttle 8 to fall freely under gravity from one end of chamber 34 to the other, when the device is inverted without any liquid in it. The upperside of shuttle top 24 and the underside of body top 28 are both flat and square to the axis of the device so that when they are in contact with each other they completely seal off body outlet 30 from any flow coming either through the shuttle via hole 22 or around it via clearance 38.

Shuttle hole 22 may be slightly smaller in diameter than core hole 18 so that there is a narrow annulus 40 on which liquid pressure can act when the bottle is inverted and then firmly squeezed, as shown in FIG. 2. Most of the flow passes straight through shuttle hole 22 but even if it is no smaller than core hole 18, the viscous drag of the liquid on the sides of hole 22 will tend to carry shuttle 8 with it. Any movement of the shuttle, however, will be resisted by the drag of shuttle skirt 26 in recess 36 and by the partial vacuum that is created in control chamber 42 that develops behind the shuttle. As clearance 38 is small, the vacuum must be mainly satisfied by flow through core hole 18 and, if the opposing drag properties are properly balanced, the proportion of the flow that is required to satisfy the vacuum will remain substantially constant, regardless of how hard the bottle is squeezed.

This means that by the time the shuttle reaches the end of its stroke and closes outlet 30, as shown in FIG. 3, the volume of liquid that has been discharged through the outlet will be in a fixed relationship to that which has filled chamber 42, i.e. the dose will stay constant.

When the bottle is returned to upright and pressure on it released, a partial vacuum is formed in the bottle which assists gravity in resetting shuttle 8 back to the position shown in FIG. 1.

The embodiment shown in FIGS. 4 and 5 also comprises three components, body 6a, shuttle 8a and core 10a, but in this case the functional parts of the doser are accommodated inside the neck of the bottle, body 6a having an outer skirt 44 which incorporates a thread or other conventional means of securing the device to the bottle. It also incorporates an integrally-hinged lid 46 which can seal the outlet. Shuttle 8a is enclosed within body skirt 32a, the open end of which is closed by core 10a. The core has central bore 18a which surrounds a hollow spigot 48 extending downwardly from shuttle 8a, leaving an annular passage 50 between them. The spigot physically divides the flow through core inlet 18a into a main component which passes through its central bore 22a and thence out of outlet 30a and a pilot component which passes along annular passage 50 into chamber 42a behind the shuttle. As this arrangement gives much a greater area on which the flow acts to drag the shuttle forward, the drag opposing motion may also be increased by the addition to the shuttle of a number of inner skirts 52, which fit into mating recesses 54 formed in core 10a. The number and depth of these mating skirts and recesses can be varied to produce a good balance between the drag forces operating on the shuttle; they also constitute a labyrinth that reduces the flow of liquid leaking past it.

Both the embodiments described above have a fixed dose and require some form of cap (to seal off the outlet and make the package 'shippable') but in the version shown in FIGS. 6 to 8, which requires no more parts, body 6b can be moved relative to core 10b from a position in which metering chamber 34b (and hence the dose) is maximised, as shown in FIG. 6, via any number of intermediate positions, such as that shown in FIG. 7, which give smaller doses, to the one shown in FIG. 8, in which the dose is reduced to zero. In this position the outlet is permanently closed off, so there is no need for a 'shipping' cap. An inwardly-directed annular bead 56 at the base of the body 6b engages with the bottom edge 58 of the core to hold the body in the closed position and with one of a series of annular grooves 60 to hold it in a selected dosing position. The underside of body top 28b and top 24b of the shuttle both taper inwardly downwards so that any product remaining in chamber 34b drains back through shuttle hole 22b and is not squirted out of outlet 30b when the body is pushed down to the closed position.

In all the above embodiments, leakage past the shuttle has been minimised by some form of labyrinth seal between the shuttle and the metering chamber but, in the embodiment shown in FIG. 9, this leakage is completely eliminated by a flexible membrane 62 (which could be formed integrally with shuttle 8c) and sealed to the sides of metering chamber 34c by being trapped between body 6c and core 10c. In this embodiment, which is shown just after the bottle has been inverted and squeezed, central hole 22c does not pass straight through the shuttle but connects with oblique passages 64 that pass the main flow into metering chamber 34c in such a way that outlet 30c can be centrally located rather than offset.

In the embodiment shown in FIG. 10, it is inlet hole (or holes) 18d which is offset and leads directly into annular recess 36*d* between the skirts 12*d* and 32*d* of core 10*d* and body 6*d* respectively, the flow being divided by the skirt 26*d* of shuttle 8*d* into a main component, which passes around the outside and thence via metering chamber 34*d* to central outlet 30*d*, and a pilot component, which passes on the inside into control chamber 42*d*.

As there is no separate outlet from control chamber 42*d*, it may take a long time to empty when the bottle is returned to upright but in the embodiment shown in FIG. 11, which is in all other respects similar to that shown in FIG. 10, a ball valve 66 opens drain back port 68 when the bottle is upright, as shown, to allow the chamber to empty rapidly and reset the device.

The embodiment shown in FIG. 12 is exactly the same as that shown in FIGS. 1 to 3 except that a hollow spigot 69 extends from the centre of core 12*e* through central hole 22 in shuttle 8 to within a short distance of end face 28 of body 6 so that the main flow is fed into the metering chamber 34 close to outlet 30. The pilot flow is fed into control chamber 42 behind shuttle 8 via a separate hole 70 in top 14*e* of core 12*e*. As the clearance between spigot 69 and shuttle hole 22 is minimal, the main and pilot flows are almost completely separated and the ratio between them should therefore be more constant than when they can mingle.

What is claimed is:

1. A liquid dosing device for fitting to the neck of a squeezable bottle comprising a metering chamber having an inlet or inlets at its inward end to connect its interior to the inside of the bottle and an outlet or outlets at its outward end though which liquid is dispensed, the metering chamber being divided by a freely-moving shuttle into an inlet chamber on the inlet side of the shuttle and an outlet chamber on the outlet side of the shuttle falling to the inlet end of the metering chamber when the bottle is upright, the chamber and shuffle being so configured that, when the bottle is inverted and then squeezed, liquid which is forced in the metering chamber has a main flow component which passes through or around the shuttle and into the outlet chamber but by-passes the inlet chamber behind the shuttle, this flow then being discharged through the outlet(s), and a pilot flow component which is fed into the inlet chamber behind the shuttle but is prevented from passing into the outlet chamber, so that although the shuttle tends to be moved by the viscous drag or impact of the flow of liquid upon it and such movement expands the inlet chamber behind it, the inlet chamber expands only as fast as the pilot flow can fill the expanding inlet chamber such that the ratio of main to pilot flow components determines the rate at which the shuttle will move and hence how much liquid is dispensed before the shuttle reaches the far end of the metering chamber, where it occludes the outlet(s) and prevents any further dispensing of liquid until the process is repeated.

2. A dosing device as claimed in claim 1 wherein the main flow component constitutes the major portion of the whole flow of liquid forced into the metering chamber and the pilot flow constitutes a minor portion.

3. A dosing device as claimed in claim 2 in which there is a passage through the shuttle but a peripheral seal prevents any significant flow around it.

4. A dosing device as claimed in claim 3 in which the peripheral seal is a flexible membrane.

5. A dosing device as claimed in claim 1 in which there is a passage through the shuttle but a peripheral seal prevents any significant flow around it.

6. A dosing device as claimed in claim 5 in which the peripheral seal is a flexible membrane.

7. A dosing device as claimed in claim 5 in which the shuttle seal is a labyrinth formed between the walls of the shuttle and those of the metering chamber.

8. A dosing device as claimed in claim 5 in which the shuttle seal is a labyrinth formed between the walls of the shuttle and those of the metering chamber.

9. A dosing device as claimed in claim 1 in which the main flow component and the pilot flow component are conducted along separate passageways.

10. A dosing device as claimed in claim 1 in which the main flow component is not physically separated from the pilot flow component.

11. A dosing device as claimed in claim 10 in which the metering chamber and shuttle are both of circular cross-section, the shuttle having a central hole which is in alignment with the inlet to the chamber and out of alignment with the outlet, the outlet being at least as large as the inlet, and both being at least as large as the hole through the shuttle.

12. A dosing device as claimed in claim 1 in which the distance between the inlet and outlet may be altered to vary the size of the dose or close the outlet.

13. A dosing device as claimed in claim 1 in which the device is fitted with an integral or removable lid.

14. A dosing device as claimed in claim 1 wherein the metering chamber is cylindrical.

* * * * *

UNITED STATES PATENT AND TRADEMARK OFFICE
CERTIFICATE OF CORRECTION

PATENT NO. : 6,997,358 B2 Page 1 of 1
DATED : February 14, 2006
INVENTOR(S) : Anthony Charles Lammond Wass It is certified that error appears in the above-identified patent and that said Letters Patent is hereby corrected as shown below:

<u>Column 5,</u>
Line 35, after "and" delete "shuffle" and insert -- shuttle --.

Signed and Sealed this

Ninth Day of May, 2006

JON W. DUDAS
*Director of the United States Patent and Trademark Office*